United States Patent [19]
Leach et al.

[11] Patent Number: 5,627,724
[45] Date of Patent: May 6, 1997

[54] COMBINATION SERVICE ENTRANCE DEVICE WITH PROVISIONS FOR DISTRIBUTING POWER TO MULTIPLE SERVICE DISCONNECTS

[75] Inventors: Thomas C. Leach; James P. Mills, Jr., both of Lexington, Ky.

[73] Assignee: Square D Company, Palatine, Ill.

[21] Appl. No.: 490,219

[22] Filed: Jun. 14, 1995

[51] Int. Cl.[6] .................................................. H02B 1/00
[52] U.S. Cl. .......................... 361/663; 361/622; 361/648; 361/668
[58] Field of Search ................... 174/66; 324/110, 324/156; 439/544; 361/622–623, 631, 641, 648, 659, 660, 662–663, 667–669, 672

[56] References Cited

U.S. PATENT DOCUMENTS

| | | | |
|---|---|---|---|
| 3,458,768 | 7/1969 | Schubert | 361/641 |
| 3,707,652 | 12/1972 | Coffey et al. | 361/648 |
| 3,707,653 | 12/1972 | Coffey et al. | 361/622 |
| 3,783,343 | 1/1974 | Byland | 317/107 |
| 3,858,091 | 12/1974 | Wilkinson | 317/120 |
| 3,906,295 | 9/1975 | Tessmer | 361/663 |
| 3,949,277 | 4/1976 | Yosset | 317/120 |
| 4,443,654 | 4/1984 | Flachbarth et al. | 174/78 |
| 4,532,574 | 7/1985 | Reiner et al. | 361/660 |
| 4,623,859 | 11/1986 | Erickson et al. | 335/14 |
| 4,796,844 | 1/1989 | Barker | 248/222.2 |
| 4,920,476 | 4/1990 | Brodsky et al. | 364/140 |
| 5,180,051 | 1/1993 | Cook et al. | 200/400 |
| 5,301,083 | 4/1994 | Grass et al. | 361/64 |
| 5,404,266 | 4/1995 | Orchard et al. | 361/667 |
| 5,418,683 | 5/1995 | Orchard et al. | 361/672 |

*Primary Examiner*—Gregory D. Thompson
*Attorney, Agent, or Firm*—Larry I. Golden; Kareem M. Irfan

[57] ABSTRACT

The present invention provides a combination service entrance device which contains a common enclosure that is divided by a center barrier into a first section for housing a watt-hour meter socket and a second section for housing a panel board containing at least two service disconnects. The meter socket provides power for use at least two output terminals. A separate connector having at least two connection points in a first plane and at least one connection point in a second plane is coupled to each of the socket meter output terminals. Substantially flexible insulated conductors are coupled to the connection points in the connectors and the service disconnects to provide power to the service disconnects. The present invention provides a method for distributing power from a meter socket having at least two power output terminals to at least two service disconnects placed in combination service entrance device, which contains the steps of: connecting a separate connector having at least two connection points in a first plane and at least one connection point in a second plane to each output terminal of the meter socket; connecting a substantially flexible insulated conductor between each of the connectors and the service disconnects for providing power from the meter socket output terminals to each of the service disconnects.

8 Claims, 3 Drawing Sheets

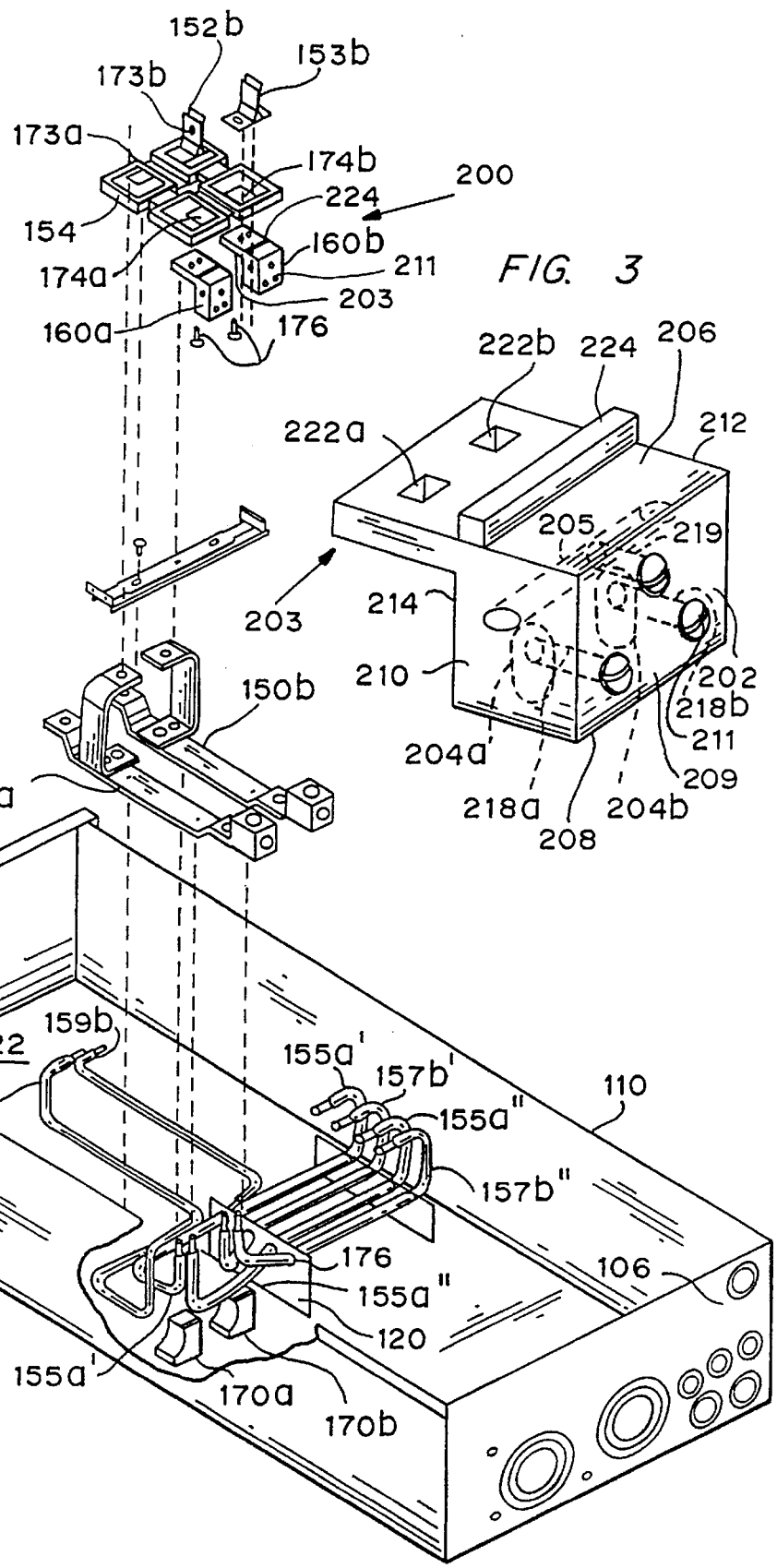

COMBINATION SERVICE ENTRANCE DEVICE WITH PROVISIONS FOR DISTRIBUTING POWER TO MULTIPLE SERVICE DISCONNECTS

BACKGROUND OF THE INVENTION

1. Field of the Invention

This invention relates generally to electrical power distribution apparatus and more particularly to an improved combination service entrance device having novel means for distributing power from the meter socket to multiple service disconnects.

2. Description of the Related Art

Combination service entrance devices having a common enclosure for housing a utility meter socket, and a load center or panel board having one or more service disconnects and a plurality of branch circuit breakers have gained commercial use, particularly for use in residential dwellings. The term "combination" refers to the fact that the unit encloses both the mounting provisions for a utility-company watt-hour meter ("meter") and a panel board containing circuit breakers for the distribution, control and protection of various circuits in a building.

The utility companies require that the utility meter section of any such combination service entrance device be separated and sealed from the customer's side, i.e., the circuit breakers. Therefore, the manufacturers of such devices place a solid barrier at or near the center of the common enclosure to provide two sections or compartments: one sealed compartment for housing the meter socket and the other unsealed compartment for housing the panel board.

In the majority of cases, the panel board contains a single circuit breaker or main service disconnect and a plurality of branch circuit breakers which distribute power to individual loads. However, in some applications there is a need to distribute power from the meter section to multiple service disconnects or main circuit breakers placed in spaced relation to each other in the panel board section. In a typical application, the panel board section contains a main circuit breaker for a dwelling and main circuit breakers to control a device, such as a well pump.

The physical space to make connections on the load side of the watt-hour meter socket is usually quite limited. Most of the prior art systems utilize bus bars to distribute the power from the meter socket to more than one location. Bus bars are very difficult to insulate from accidental contact, difficult and expensive to manufacture and equally difficult to route around various components in the service entrance device.

The present invention addresses the above-noted deficiencies of the prior art combination service entrance units and provides an improved combination service entrance device which utilizes a novel connector coupled to each of the output ends of the meter socket and insulated conductors to route power from the utility meter section to multiple service disconnects placed in the panel board section. The system of the present invention is safer and less expensive to manufacture compared to the systems using bus bars for routing power to the service disconnects.

SUMMARY OF THE INVENTION

The present invention provides a combination service entrance device which contains a common enclosure that is divided by a center barrier into a first section for housing a watt-hour meter socket and a second section for housing a panel board containing at least two service disconnects. The meter socket has at least two output terminals. A separate connector having at least two connection outlets in a first plane and at least one connection outlet in a second plane is coupled to each of the meter socket output terminals. Substantially flexible insulated conductors are coupled to the connection outlet and the service disconnects to provide power to the service disconnects.

The present invention provides a method for distributing power from a meter socket having at least two power output terminals to at least two service disconnects placed in a combination service entrance device. This method contains the steps of: connecting a separate connector having at least two connection points in a first plane and at least one connection outlet in a second plane to each output terminal of the meter socket; and connecting a flexible insulated conductor between each of the connectors and the service disconnects for providing power from the meter socket output terminals to each of the service disconnects.

Examples of the more important features of the invention thus have been summarized rather broadly in order that the detailed description thereof that follows may be better understood and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment taken in conjunction with the accompanying drawings, in which like elements have been given like numerals and wherein:

FIG. 3 shows an isometric view of the novel connector for use in the combination service entrance device of FIG. 1.

FIG. 4 is an isometric view showing the manner of connecting the novel connector to the meter socket and the routing of conductors between the connector and the service disconnects.

DESCRIPTION OF THE PREFERRED EMBODIMENTS

Figure 1:
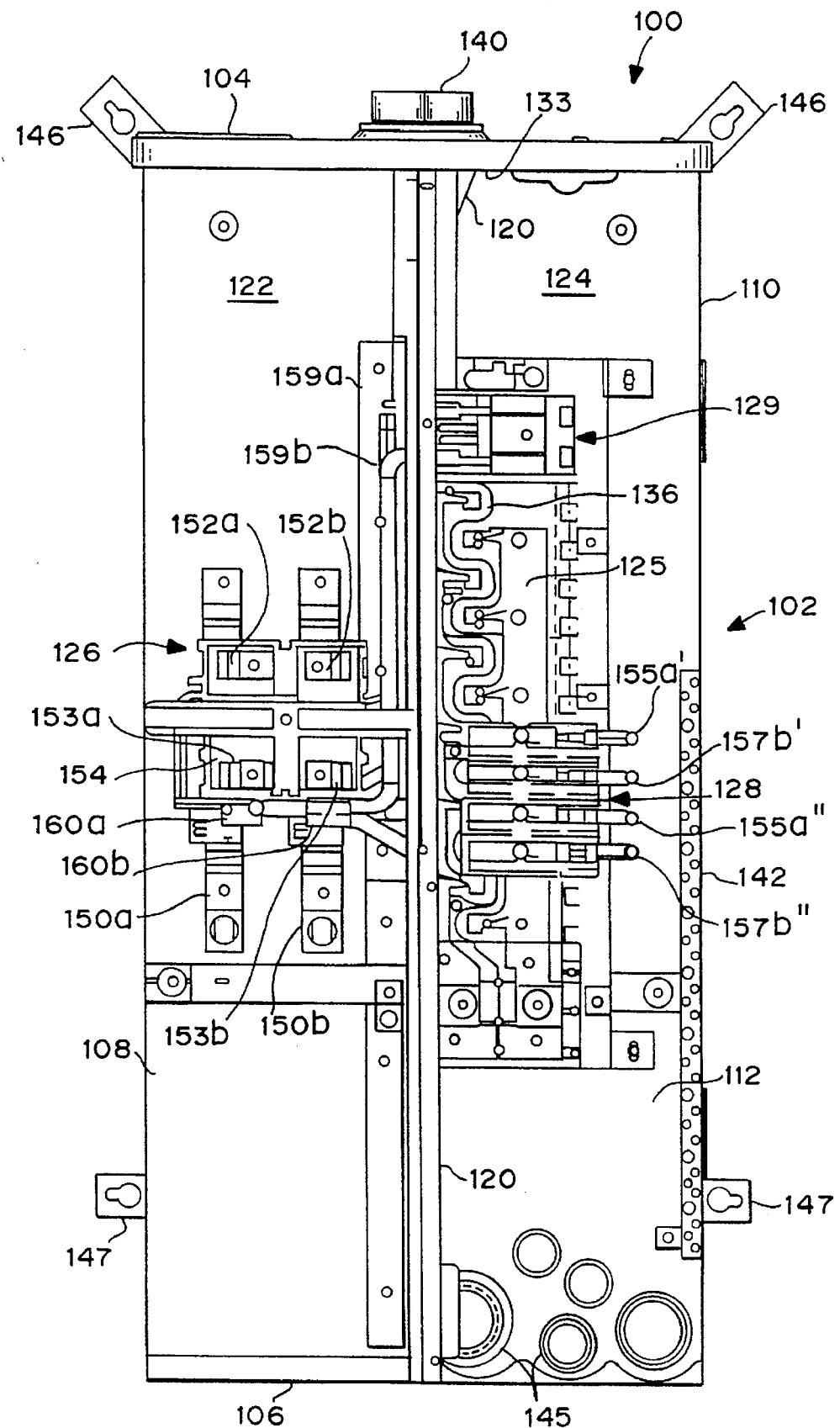
FIG. 1 shows the front interior of the combination service entrance device according to the present invention.
Figure 2:
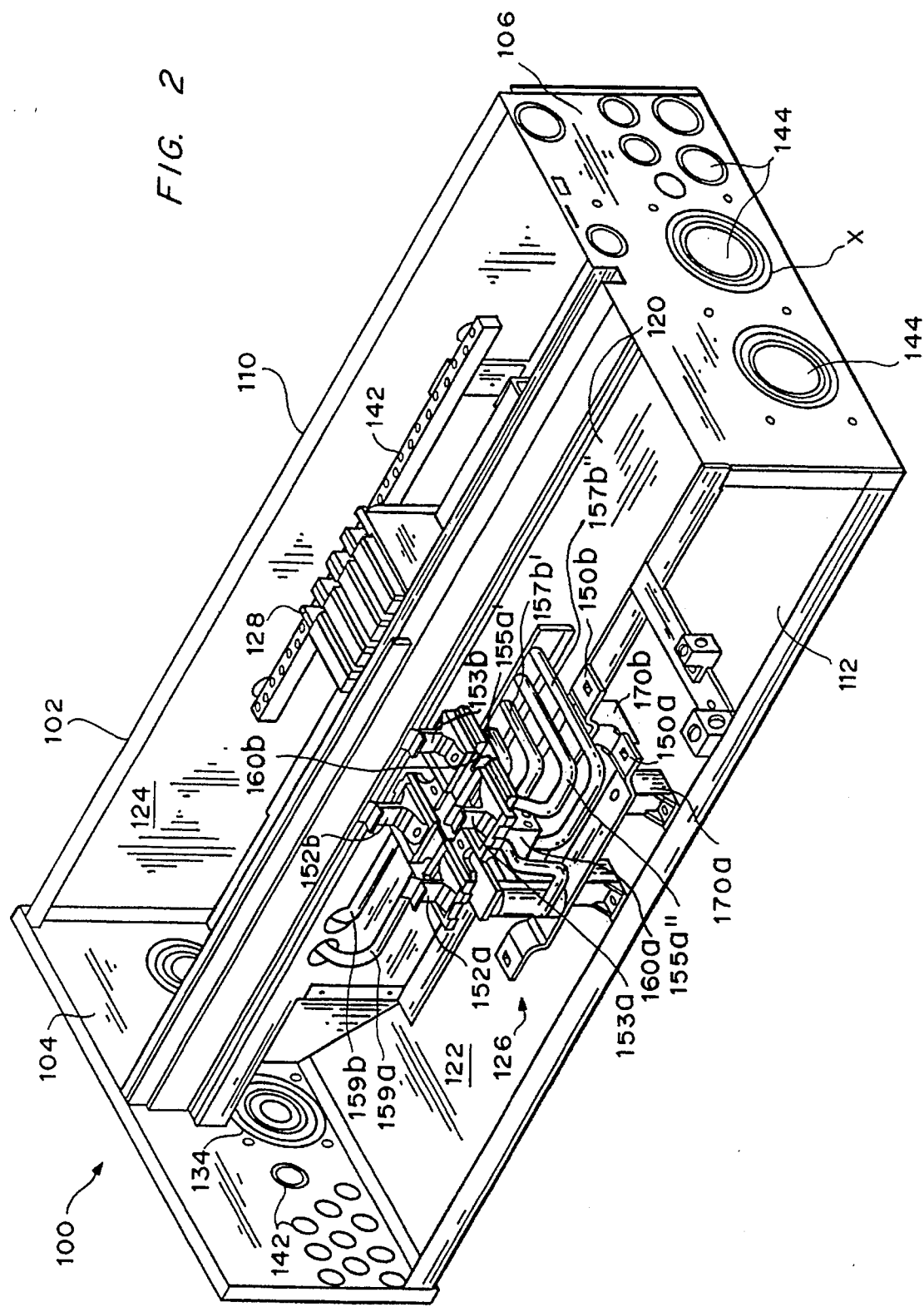
FIG. 2 shows a partial isometric view of the combination service entrance device of FIG. 1.

FIG. 1 shows the front interior of an embodiment of the combination service entrance device 100 according to the present invention. FIG. 2 is a partial isometric view of the combination device 100. The combination service entrance device 100 preferably contains a unitary box-like (rectangular) common enclosure 102 having a top panel 104, bottom panel 106, left side panel 108, right side panel 110, and back panel 112. The common enclosure 102 preferably is made from a suitable metal which may be treated with a corrosion-resistant zinc finish and electrostatically-deposited painted surface to provide protection from the outside environment. A solid center barrier 120 divides the common enclosure 102 into a utility compartment or section 122 for housing therein a watt-hour meter socket 126 and a customer compartment or section 124 for housing therein a panel board 125 having at least two service disconnects 128 and 129.

As noted earlier, the utility companies require that the utility section, such as section 122, of any combination service entrance device be separated and sealed from the customer section or the panel board section, such as section 124. To segregate and seal the utility section 122 from the panel board section 124 and to incorporate provisions for mounting a center-mounted conduit hub 140 on the top panel 104, the solid center barrier 120 is fixedly placed straight inside the common enclosure 102 extending from the inside of the bottom panel 106 of the common enclosure 102 for substantial length of the enclosure 102 and is then placed at a suitable angle toward the customer section 124. That is, the top section of the barrier 120 is offset and encroaches into the top section of the customer section 124 up to a point 133 on the top panel 104 so as to provide sufficient space at the center of the top panel 104 for mounting the center-mounted conduit hub 140. Line cables may be brought into the meter socket section 122 through the center-mounted conduit hub without the use of any external offset device, as is usually required by the prior art combination service entrance units.

A knock-out hole 134 FIG. 2 may be provided in the top panel 104 for the center-mounted conduit hub 140. Additional knock-out holes, generally designated herein by numeral 142, are provided in the top panel 104 for running wires and cables to and from the combination service entrance device 100.

Knock-out holes, generally designated herein by numeral 144, are provided in the bottom panel 106 for bringing line cables into the utility section 122 from the bottom panel 106 and for running other wires and cables to and from the combination service entrance device 100. Additionally, knock-out holes, generally designated herein by numeral 145, FIG. 1 may be provided in the back panel 112 for providing access to the customer section 124.

Still referring to FIGS. 1 and 2, the customer section 124 preferably contains a panel board 125 having at least two main circuit breakers or service disconnects placed in spaced relation to each other: one main circuit breaker service disconnect 128 for controlling power distribution to a dwelling and another main circuit breaker service disconnect 129 for controlling power distribution to a secondary load such as a water pump. The panel board 125 contains thereon a plurality of sockets 136 for receiving therein branch circuit breakers (not shown) for distributing power to the various loads in the dwelling. For convenience and clarity and not as a limitation, FIG. 1 shows two service disconnects 128 and 129: however, the system may be configured to have more than two service disconnects. The panel board preferably is placed adjacent the center barrier 120 while a branch neutral 142 is attached to the right side panel 110.

Still referring to FIGS. 1 and 2, the utility section contains a meter socket 126 having at least a pair of bus bars 150a and 150b respectively coupled to corresponding input jaw assemblies 152a and 152b attached to a nonconductive meter socket base 154. A separate output jaw assembly corresponding to each input jaw assembly is coupled to the meter base. Output jaw assemblies 153a and 153b respectively correspond to the input jaw assemblies 152a and 152b. The utility lines (not shown) are coupled to the bus bars 150a and 150b for providing main power to the bus bars. Input terminals of a utility meter (not shown) are securely placed in the input jaw assemblies 152a and 152b, while the output terminals of the utility meter are placed in the output jaw assemblies 153a and 153b. The output jaw assemblies are coupled to the various service disconnects 128 and 129 in the system for supplying power to the desired loads. In this manner any power consumed by the user is recorded by the utility meter.

In order to distribute power from the output jaw assemblies 153a and 153b to each of the service disconnects 128 and 129, a separate novel connector is coupled to each of the output jaw assemblies. Power distribution connectors 160a and 160b are shown respectively coupled to output jaw assemblies 153a and 153b. In many applications, the service disconnect for the dwelling, such as circuit breaker 128 requires two inputs from each of the utility meter outputs 153a and 153b, while the other service disconnect, such as circuit breaker 129, requires one input from each utility meter output. Other applications may require different numbers of inputs to the service disconnects and may use more than two service disconnects. For ease of explanation of the present invention and not as a limitation, the present invention is described in terms of the above-noted configuration. It will, however, be understood that the present invention applies equally to combination service units utilizing more than two service disconnects.

As shown in FIG. 2, two insulated conductors 155a' and 155a" are connected between the power distribution connector 160a and the service disconnect 128, while two insulated conductors 157b' and 157b" are connected between the power distribution connector 160b and the service disconnect 128. Similarly, insulated conductors 159a and 159b are respectively connected between the power distribution connectors 160a and 160b and the service disconnect 129 FIG. 1. The preferred configuration of the power distribution connectors 160a and 160b, the manner of connecting the power distribution connectors to the utility meter socket 126 and the routing of the electrical conductors from the power distribution connectors 160a and 160b to the multiple service disconnects in the combination service entrance device 100 will now be described while referring to FIGS. 1 through 4.

FIG. 3 shows a preferred embodiment of a power distribution connector 200 according to the present invention. The power distribution connector 200 has a substantially rectangular body 202 and a cantilever 203 extending from a top side 206 of the rectangular body 202. The body 202 contains a bottom side 208, a front side 209, a left side 210, a right side 212 and a back side 214. The body 202 preferably contains a plurality of holes, such as shown by numerals 204a and 204b, at the bottom side 208 for accommodating or receiving electrical conductors not shown therein. At least one hole, preferably a through hole such as hole 205, extending from the left side 210 to the right side 212 of the body 202 is provided for placing electrical conductors therein from either the left side 210 or the right side 212. A hole 218a, intersecting the hole 204a, is formed in the front side 202. The hole 218a is preferably a threaded hole designed to accept a wire binding screw not shown therein in a manner such that when the screw is inserted in the hole 218a, it will secure a conductor placed in the hole 204a. Similarly, holes 218b and 219 may be provided to similarly secure conductors placed in the holes 204b and 205 respectively.

The cantilever 203 preferably contains a pair of alternate substantially rectangular mounting holes 222a and 222b for accepting a square head screw not shown therein. An antiturn member 224 in the form of a raised ridge is provided on the top side 206 of the body 202 and/or on the cantilever section 203. It is preferred that all the screw holes or any other desired means to secure the conductors in the body 202 be accessible from the front side 209 of the body 202 for easy connection of the conductors to the body 202.

Now referring to FIG. 4, it shows the preferred manner of placement of certain components of the meter socket 126 in the utility section, 122 the manner of connecting the power distribution connectors 160a and 160b to the meter socket 126 and the routing of the conductors from the power distribution connectors 160a and 160b to the main circuit breakers placed in the panel board section 124 FIG. 1 of the combination service entrance device 100 FIG. 1. Bus bars 150a and 150b are respectively placed on nonconductive bus supports 170a and 170b that are fixedly attached to the back panel 112. A meter socket base 154 having holes for the desired number of jaw assemblies is placed on the bus bars 150a and 150b. In the configuration shown in FIGS. 1, 2 and 4 the meter socket base 154 contains four substantially square holes: two holes 173a and 173b for attaching thereto the input jaw assemblies 152a not shown in FIG. 4, and 152b and two holes 174a and 174b for attaching thereto the output jaw assemblies 153a not shown in FIG. 4 and 153b. The power distribution connectors 160a and 160b are respectively connected to the output jaw assemblies 153a and 153b placed in holes 174a and 174b. The cantilever portion of the power distribution connectors 160a and 160b securely placed underneath their associated output jaw assemblies 153a and 153b by a squared necked shoulder bolt 176. The raised rib 224 remains in front and engaged to the front of the meter socket base 154. The rib 224 prevents turning of the connector during tightening of the binding screws 211 and pulling of the wiring from the connectors to the main circuit breakers.

In this configuration, two conductors are routed out of the bottom and one conductor from the side of each of the power distribution connectors 160a and 160b. Further, the square alternative mounting holes 222a and 222b permit the connectors to be mounted in an offset position, which provides adequate spacing between the power distribution connectors 160a and 160b. The conductors, such as conductors 155a', 155a", 157b' and 157b" are routed from the utility meter section 122 to the panel board section 124 FIG. 1 via holes not shown made in the center barrier 120 FIG. 1. These conductors preferably are routed underneath the panel board 125 FIG. 1. Conductors 159a and 159b are similarly routed from the power distribution connectors 160a and 160b to the second main circuit breaker 129 FIG. 1. Additional holes at the bottom and/or sides of the connectors may be provided when more than two main circuit breakers are used in the system.

Thus, the present invention provides a combination service entrance device wherein a power distribution connector having provisions in at least two different planes for connecting conductors thereto are connected to the utility meter output. Insulated wires are routed from the power distribution connectors to the main circuit breakers in the system. The insulated conductors are secured in their respective holes in the power distribution connectors by set screws inserted from a third plane of the power distribution connector. Such a configuration more efficiently utilizes the limited space available at the meter socket in the utility section of the combination service entrance device and eliminates the use of bus bars to distribute power to more than one main circuit breaker in the system.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An electrical power distribution device, comprising:
   (a) a common enclosure having a first section and a second section;
   (b) at least two service disconnects placed in the second section;
   (c) a meter socket placed in the first section, said meter socket having at least two output terminals;
   (d) a separate connector coupled to each of the output terminals of the meter socket, each such connector having a connection outlet in a first plane and a connection outlet in a second plane; and
   (e) a flexible insulated conductor routed between each of the said connector and service disconnect.

2. An electrical power distribution device, comprising:
   (a) a common enclosure having divided by a barrier into a first section and a second section;
   (b) at least two service disconnects placed in spaced relation to each other in the second section;
   (c) a meter socket placed in the first section, said meter socket having at least two output terminals;
   (d) a separate connector coupled to each of the output terminals of the meter socket, each such connector having at least two connection outlets in a first plane for attaching a conductor thereto and at least one connection outlet in a second plane for attaching a conductor thereto; and
   (e) a flexible insulated conductor routed between each of the said connector and service disconnect.

3. An electrical power distribution device, comprising:
   (a) a common enclosure divided by a barrier into a first section and a second section;
   (b) a plurality of service disconnects placed in spaced relation to each other in the second section;
   (c) a meter socket placed in the first section, said meter socket having at least two output terminals;
   (d) a separate connector coupled to each of the output terminals of the meter socket, each such connector having a plurality of holes in a first side of the connector for receiving therein a conductor, at least one hole in a second side of the connector for receiving therein a conductor, a screw hole formed in a third side of the connector which intersects with the holes formed in the first and second sides of the connector for placing a screw therein for securing any conductors placed in the holes in the first and second sides of the connector; and
   (e) a flexible insulated conductor routed between each of the said connector and service disconnect.

4. An electrical power distribution device, comprising:
   (a) a common enclosure divided by a barrier into a first section and a second section;
   (b) a plurality of service disconnects placed in spaced relation to each other in the second section;
   (c) a meter socket placed in the first section, said meter socket having at least two output terminals;
   (d) a separate connector coupled to each of the output terminals of the meter socket, each such connector having a plurality of openings in a first side of the connector for receiving therein a conductor, at least opening in a second side of the connector for receiving therein a conductor, a separate opening associated with each opening in the first and second sides of the connector formed in a third side of the connector and intersecting its associated opening for securing a conductor placed in its associated hole by means of a set screw; and
   (e) a substantially flexible insulated conductor attached between an opening in each of the connectors and each of the service disconnects through the barrier.

5. The apparatus as specified in claim 4, wherein the plurality contains two openings in the first side of each of the connectors.

6. The apparatus as specified in claim 4, wherein the plurality contains three openings in the first side of each of the connectors.

7. The apparatus as specified in claim 4, wherein the plurality contains two openings, each said opening in the first and second sides being a hole for receiving therein a conductor and the opening in the third side being a threaded hole for receiving therein a screw for securing a conductor placed in its associated hole.

8. The apparatus as specified in claim 4, wherein the plurality contains two openings, each said opening in the first and second sides being a hole for receiving therein a conductor, the opening in the third side being a threaded hole for receiving therein a screw for securing a conductor placed in its associated hole and wherein the first, second and third sides are substantially orthogonal to each other.

* * * * *